United States Patent [19]

Suzuki

[11] Patent Number: 4,822,124
[45] Date of Patent: Apr. 18, 1989

[54] OPTICAL MATRIX SWITCH

[75] Inventor: Syuji Suzuki, Tokyo, Japan

[73] Assignee: NEC Corporation, Tokyo, Japan

[21] Appl. No.: 153,679

[22] Filed: Feb. 8, 1988

[30] Foreign Application Priority Data

Feb. 10, 1987 [JP] Japan .................................. 62-30180

[51] Int. Cl.$^4$ .............................................. G02B 6/10
[52] U.S. Cl. ............................... 350/96.11; 350/96.12;
350/96.14
[58] Field of Search ............... 350/96.13, 96.14, 96.15,
350/96.20, 96.11, 96.12

[56] References Cited

U.S. PATENT DOCUMENTS

| 4,473,271 | 9/1984 | Mitchell | 350/96.15 |
| 4,681,210 | 10/1986 | Kondo | 350/96.14 |
| 4,681,397 | 7/1987 | Bhatt | 350/96.20 |
| 4,693,547 | 9/1987 | Soref et al. | 350/96.13 |

FOREIGN PATENT DOCUMENTS 241171 10/1987 European Pat. Off. .......... 350/96.16

OTHER PUBLICATIONS

MacDonald, J. of Lightwave Technology, vol. LT-5, No. 6, Jun. 1987, "Switched Optical Delay-Line Signal Processors," pp. 856-860.
Polky et al., Applied Optics, vol. 21, No. 19, Oct. 1, 1982, "Optical Waveguide Circuit Design of an Adaptive Filter in the Residue Number System", pp. 3539-3550.
Soref, Applied Optics, vol. 21, No. 8, Apr. 15, 1982, "Electrooptic 4×4 Matrix Switch for Multimode Fiber-Optic Systems," pp. 1386-1393.
T. Shimoe et al., "Path-Independent Insertion Loss Optical Space Switch," Optical Fiber Communication Conference Technical Digest WB2, 1/2/87.

*Primary Examiner*—William L. Sikes
*Assistant Examiner*—Frank González
*Attorney, Agent, or Firm*—Sughrue, Mion, Zinn, Macpeak & Seas

[57] ABSTRACT

An optical matrix switch comprises 1×M/2 optical switch means of N in number, optical switch groups of N/2 in number, and N/2×1 optical switch means of M in number, where N is a number of inputs, and M is a number of outputs. Each of the 1×M/2 optical switch means includes a predetermined number of optical switch elements each having a function to switch an optical signal between inputs and outputs in accordance with an applied electric field, and has one input and outputs of M/2 in number. The predetermined number is decided dependent on an equation of log$_2$M/2. Each of the optical switch groups includes optical switch elements of M/2 in number arranged transversely, and each of the N/2×1 optical switch means includes a predetermined number of optical switch elements. The predetermined number is decided dependent on an equation of log$_2$N/2. A longitudinal length of the optical matrix switch is approximately (log$_2$M/2+1+log$_2$N/2 times a length of an optical switch element. Therefore, the optical matrix switch is made smaller in the longitudinal direction.

4 Claims, 3 Drawing Sheets

OPTICAL MATRIX SWITCH

FIELD OF THE INVENTION

The invention relates to an optical matrix switch, and more particularly to an optical matrix switch through which an optical output signal from one of input optical fibers is supplied to a selected one of output optical fibers.

BACKGROUND OF THE INVENTION

An optical matrix switch is applied to an optical communication network in which a large quantity of data are transmitted through optical fibers in a high speed whereby an optical output signal from one of input optical fibers each connected to the optical matrix switch can be supplied to a selected one of output optical fibers also connected to the optical matrix switch.

One of conventional optical matrix switches is described in the Optical Fiber Communication Conference Technical Digest WB2 published on Jan. 19, 1987. The optical matrix switch comprises a plural rows of optical switch elements dependent upon the respective number of input and output fibers to be connected thereto. Each of the optical switch elements is provided with two inputs and two outputs wherein an optical signal of one of the two inputs can be supplied to any one of the two outputs so that an optical switching operation is realized. The construction and operation of the optical matrix switch will be described in detail later.

According to the conventional optical matrix switch, however, a size thereof is inevitably large in its longitudinal direction. For instance, where the optical matrix switch is provided with four inputs and four outputs to be called "4×4 optical matrix switch", four rows of optical switch elements must be included therein. Therefore, the longitudinal length can not be less than a length as much as four times the longitudinal dimension of an optical switch element.

As a result, a substrate on which the four rows of the optical switch elements are provided must be large in its surface area thereby to increase a fabricating cost thereof.

Accordingly, it is an object of the invention to provide an optical matrix switch in which a size thereof can be smaller in its longitudinal direction.

It is a further object of the invention to provide an optical matrix switch in which a substrate for providing a plural rows of optical switch elements thereon can be smaller to avoid the increase of a fabricating cost thereof.

According to the invention, an optical matrix switch comprises, inputs of N in number where N is an integer,
outputs of M in number where M is an integer,
1×M/2 optical switch means of N in number each including a predetermined number of optical switch elements and having a single input connected to a corresponding one of said inputs of N, and having outputs of M/2 in number, optical switch groups of N/2 in number, each of said optical switch groups including optical switch elements of M/2 in number, each of said optical switch elements being of a 2×2 optical switch element having two inputs and two outputs, and N/2×1 optical switch means of M in number each including a predetermined number of optical switch elements and having a single output connected to a corresponding one of said outputs of M, and having inputs of N/2 in number, wherein said outputs of M/2 in each of said 1×M/2 optical switch means of N are respectively connected to said optical switch elements of M/2 of a corresponding group among said optical switch groups of N/2, and said inputs of N/2 in each of said N/2×1 optical switch means of M are respectively connected to optical switch elements each selected from each of said optical switch groups of N/2 whereby an optical signal supplied to any one of said inputs of N is switched to be appeared at a predetermined one of said outputs of M by selecting a predetermined one of optical signal transmitting paths formed through said optical switch groups of N/2 between said 1×M/2 optical switch means of N and said N/2×1 optical switch means of M in accordance with "BAR" and/or "CROSS" states of corresponding optical switch elements therein.

BRIEF DESCRIPTION OF THE DRAWINGS

The invention will be described in more detail in conjunction with drawings wherein.

DESCRIPTION OF PREFERRED EMBODIMENTS

Before explaining an embodiment according to the invention, the aforementioned conventional optical matrix switch will be described in conjunction with FIG. 1 in which a 4×4 optical matrix switch is shown. The 4×4 optical matrix switch comprises four rows of optical switch elements 21 to 24, 31 to 34, 41 to 44, and 51 to 54 respectively provided on a substrate 100 and connected through optical waveguides grown thereon. The substrate 100 is provided with four inputs 11 to 14 and four outputs 61 to 64 on both end planes thereof.

Figure 2:
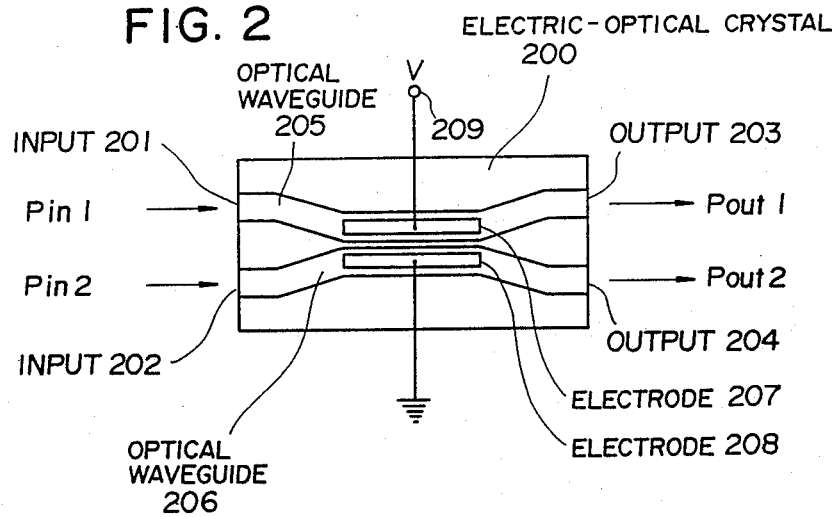
FIG. 2 is an explanatory diagram showing an optical switch element used in the conventional optical matrix switch in FIG. 1, FIGS. 3A and 3B are explanatory charts showing switching properties of the optical switch element in FIG. 2, and FIGS. 4 and 5 are explanatory diagrams showing a first and second embodiments according to the invention.

FIG. 2 shows one of the optical switch elements which comprises two optical waveguides 205 and 206 grown to be adjacent to each other on an optical crystal substrate 200 having a electro optic effect, and electrodes 207 and 208 to one of which a voltage V is applied through a terminal 209 and the remaining one of which is connected to the ground wherein the respective terminals of the optical waveguides 205 and 206 are used to be inputs 201 and 202, and outputs 203 and 204.

Figure 3A:
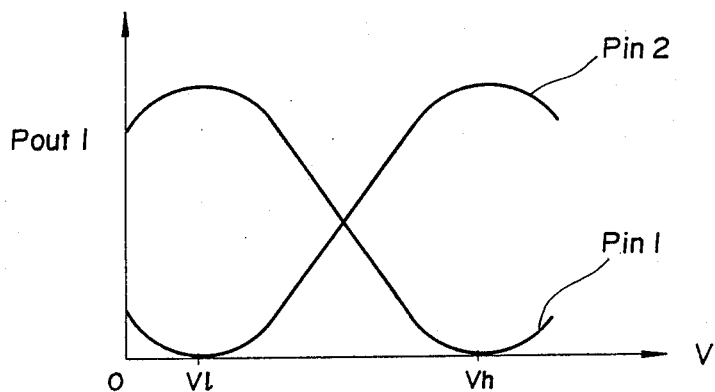
Figure 3B:
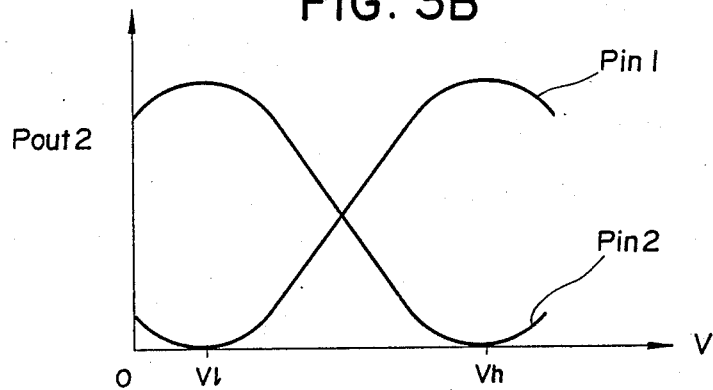

FIG. 3A shows Pout 1 which is an optical signal at the output 203 in regard to Pin 1 and Pin 2 which are optical signals at the inputs 201 and 202 in a case where a voltage V is applied to be controlled from Vl to Vh to the terminal 209 of the electrode 207, while FIG. 3B shows Pout 2 which is an optical signal at the output 204 in regard to the Pin 1 and Pin 2 in a case where the voltage V is applied thereto. As clearly understood from FIGS. 3A and 3B, the Pin 1 is obtained to be as the Pout 1 at the output 203, and the Pin 2 is obtained to be as the Pout 2 at the output 204 when the voltage Vl is applied to the terminal 209 of the electrode 207, while the Pin 2 is obtained to be as the Pout 1 at the output 203, and the Pin 1 is obtained to be as the Pout 2 at the output 204 when the voltage Vh is applied thereto. In the optical switch element, the former is called "BAR state", while the latter is called "CROSS state".

Figure 1:
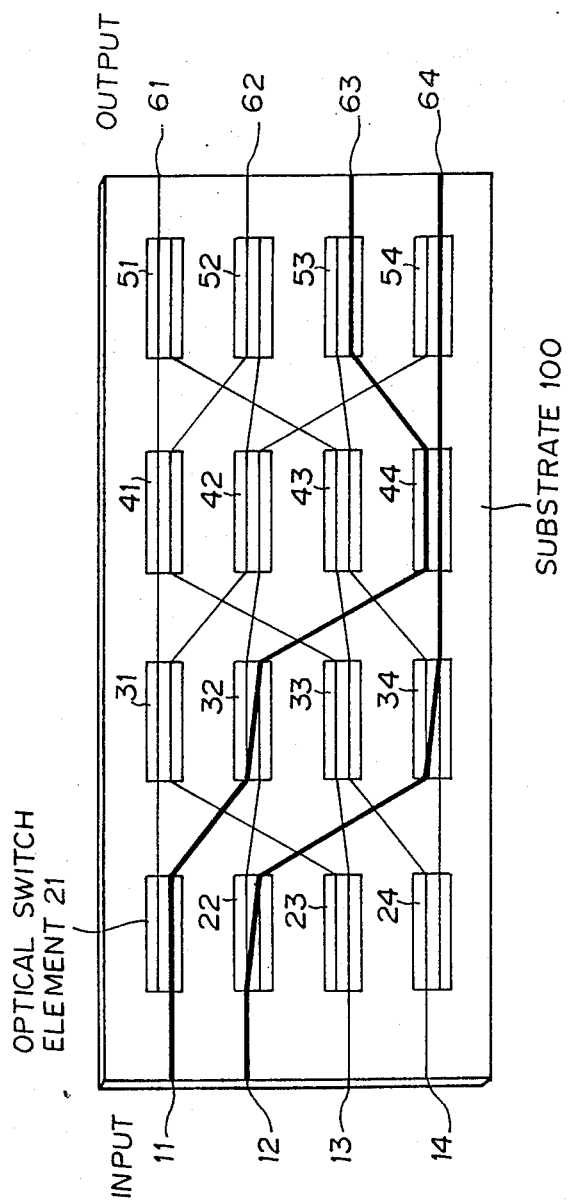
FIG. 1 is an explanatory diagram showing a conventional optical matrix switch.

In operation of the optical matrix switch as shown in FIG. 1, an optical signal is switched from the input 11 to the output 63 as indicated by a thick solid line when the optical switch element 32 is controlled to be "CROSS state", and the optical switch elements 21, 44 and 53 are controlled to be "BAR state". Further, an optical signal is switched from the input 12 to the output 64 as also indicated by a thick solid line when the optical switch elements 44 and 54 are controlled to be "BAR state", and the optical switch elements 22 and 34 are controlled to be "CROSS state". In this manner, optical signals can be switched among input and output fibers respectively coupled to the inputs 11 to 14 and outputs 61 to 64 of the optical matrix switch.

As clearly understood from the illustration in FIG. 1, the optical matrix switch is large in its size of the longitudinal direction as explained before.

Figure 4:
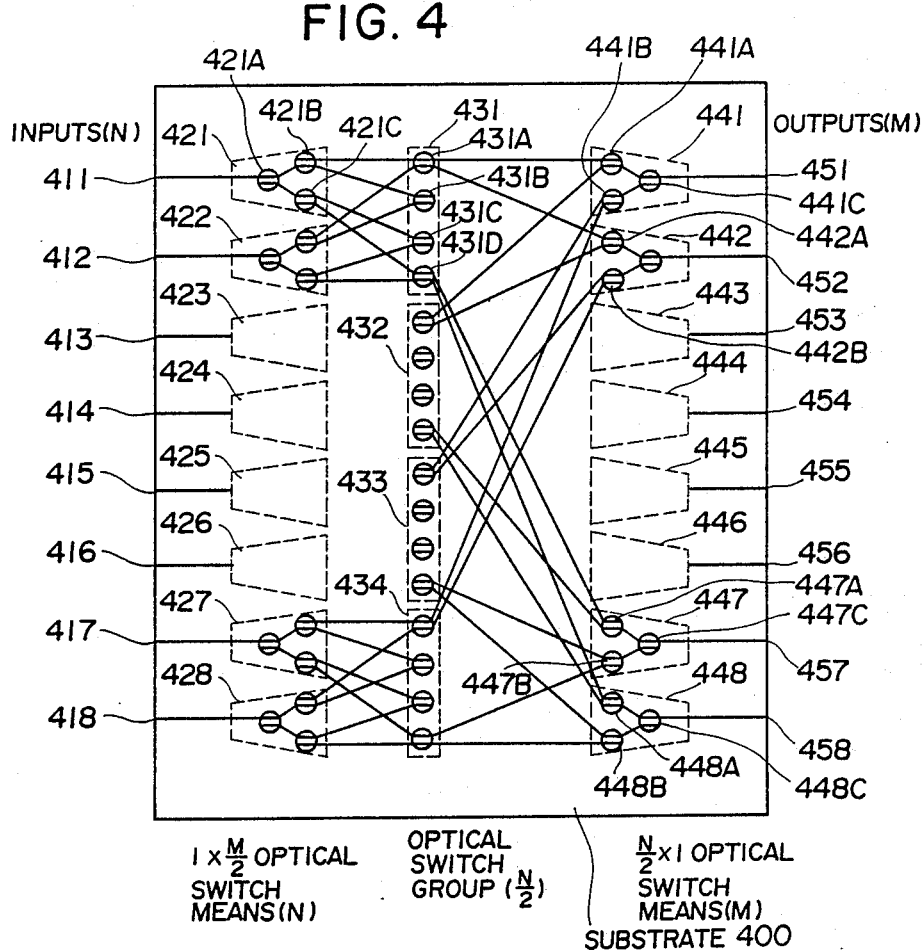

In FIG. 4, there is shown an optical matrix switch in a first embodiment according to the invention. This is an optical matrix switch which is adapted to an N×M optical matrix switch having inputs of N and outputs of M respectively in number, and comprises 1×M/2 optical switch means 421 to 428 of N in number each including, for instance, optical switch elements 421A, 421B and 421C to have one input and ouputs of M/2 in number (the remaining one input of the optical switch element 421A is idle, not specifically explained hereinafter), optical switch groups 431 to 434 of N/2 in number each including, for instance, optical switch elements 431A, 431B, 431C and 431D of M/2 in number, N/2×1 optical switch means 441 to 448 of M in number each including, for instance, optical switch elements 441A, 441B and 441C to have inputs of N/2 in number and one output (the remaining one output is idle), and a substrate 400 for providing the 1×M/2 optical switch means 421 to 428, optical switch groups 431 to 434, and N/2×1 optical switch means 441 to 448 thereon. The substrate 400 is provided thereon with inputs 411 to 418 of N in number connected to the respective inputs of the 1×M/2 optical switch means 421 to 428, and outputs 451 to 458 of M in number connected to the respective outputs of the N/2×1 optical switch means 441 to 448. The respective outputs of M/2 in number of the 1×M/2 optical switch means 421 and 422 are connected to a corresponding one of the optical switch elements 431A, 431B, 431C and 431D of M/2 in number of the first optical switch group 431. In the same manner, the respective outputs of the remaining 1×M/2 optical switch means 423 to 428 are connected to the remaining N/2 optical switch groups 432 to 434, although repeated explanations are omitted for simplification here. Further, each of the respective inputs of N/2 in number of the N/2×1 optical switch means 441 are connected to a corresponding one of the respective ouputs of the optical switch groups 431 to 434. In the same manner, the outputs of the remaining N/2×1 optical switch means 442 to 448 are correspondingly connected to the outputs of the optical switch groups 431 to 434.

In operation, an optical signal supplied to the input 411 is switched to be appeared at the output 451 as follows. For this purpose, the optical switch elements 421A and 421B in the 1×M/2 optical switch means 421 are controlled to be "BAR state" and "CROSS state" respectively so that the optical signal is transmitted from the input 411 to the optical switch element 431A of the first optical switch group 431. Further, the optical switch element 431A, and the optical switch elements 441A and 441C in the N/2×1 optical switch means 441 are controlled to be "BAR state", "CROSS state", and "BAR state" respectively whereby the optical signal is supplied from the optical switch element 431A to the output 451. On the other hand, if the optical switch element 431A, and the two corresponding optical switch elements 442A and 442C of the N/2×1 optical switch means 442 are controlled to be "CROSS state", "CROSS state", and "BAR state" respectively, the optical signal supplied to the input 411 is switched to be appeared at the output 452.

The other switching examples are explained in a table as shown below, where the corresponding optical switch elements are controlled as in the table.

| IN-PUT | 1 × M/2 OPTICAL SWITCH MEANS | | OPTICAL SWITCH GROUP | N/2 × 1 OPTICAL SWITCH MEANS | | OUT-PUT |
|---|---|---|---|---|---|---|
| 411 | 421A CROSS | 421C CROSS | 431D BAR | 447A CROSS | 447C BAR | 457 |
| 411 | 421A CROSS | 421C CROSS | 431D CROSS | 448A CROSS | 448C BAR | 458 |

In this manner, an optical signal supplied to any one of the inputs 411 to 418 can be switched to be appeared at a predetermined one of the outputs 451 to 458.

Considering a size of the optical matrix switch as shown in FIG. 4, the optical switch elements are longitudinally arranged in the 1×M/2 optical switch means 421 to 428 by $\log_2 M/2$ in number. In the embodiment, two rows of the optical switch elements 421A and 421B (or 421A and 421C) are arranged, for instance, in the 1×M/2 optical switch means 421 because the number "M" is assumed to be "8". For the same reason, two rows of the optical switch elements 441A and 441C (or 441B and 441C) are arranged, for instance, in the N/2×1 optical switch means 441 because the number "N" is "8". On the other hand, a single row of the optical switch elements 431A, 431B ------ are transversely arranged in the optical switch groups 431 to 434. Therefore, the 8×8 optical matrix switch as shown in FIG. 4 is of a size in which five rows of the optical switch elements are longitudinally arranged thereby making it smaller even than the conventional 4×4 optical matrix switch including four rows of the optical switch elements as shown in FIG. 1. In general, an optical matrix switch of the invention is made smaller to be of a size in which optical switch elements of ($\log_2 M/2 + 1 + \log_2 N/2$) in number are longitudinally arranged.

Figure 5:
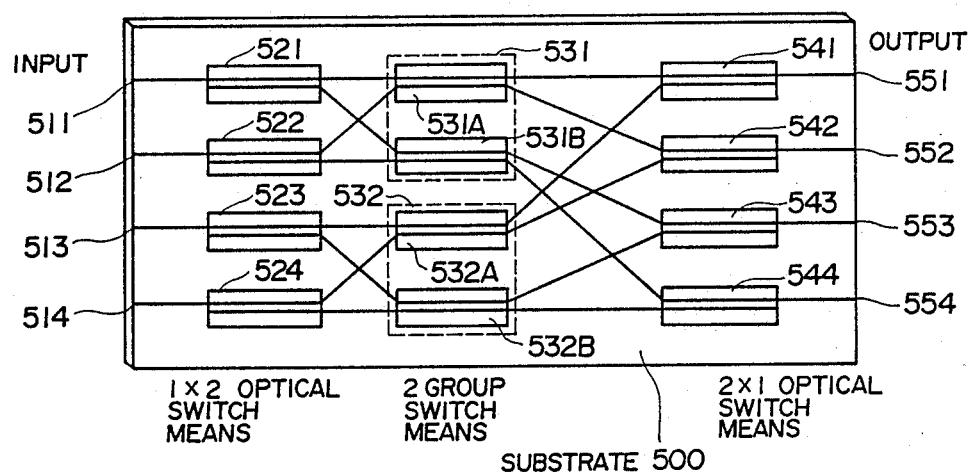

In FIG. 5, there is shown an optical matrix switch in a second embodiment according to the invention which is of a 4×4 optical matrix switch The optical matrix switch comprises 1×2 optical switch means 521 to 524 each being of an optical switch element having two input and two outputs, two optical switch groups 531 and 532 each including two optical switch elements 531A and 531B, and 532A and 532B respectively, 2×1 optical switch means 541 to 544 each being of an optical switch element having two inputs and one output, and a substrate 500 for providing the respective optical switch elements thereon and which is provided on the both end planes with four inputs 511 to 514 connected to the 1×2 optical switch means 521 to 524, and four outputs 551 to 554 connected to the 2×1 optical switch means 541 to 544. The first and second outputs of the 1×2 optical switch means 521 are connected to the first inputs of the optical switch elements 531A and 531B in the first optical switch group 531 respectively, while the first and second outputs of 1×2 optical switch means 522 are connected to the second inputs thereof respectively. In the same manner, the first and second outputs of the 1×2 optical switch means 523, and those of the 1×2 optical switch means 524 are connected to the first inputs of the optical switch elements 532A and 532B in the second optical switch groups 532, and to the second inputs thereof respectively. Further, the first and second outputs of the optical switch element 531A are connected to the first inputs of the 2×1 optical switch means 541 and 542 respectively, and the first and second outputs of the optical switch element 531B are connected to the first inputs of the 2×1 optical switch means 543 and 544 respectively. In the same manner, the respective first and second outputs of the optical switch elements 532A and 532B are connected to the second inputs of the 2×1 optical switch means 541 to 544 respectively.

In operation, where the 1×2 optical switch means 521, optical switch element 531A and 2×1 optical switch means 541 are all controlled to be "BAR state", an optical signal supplied to the input 511 is switched to be appeared at the output 551. Similarly, where the 1×2 optical switch means 521, optical switch element 531A and 2×1 optical switch means 541 are controlled to be "BAR state", "CROSS state", and "BAR state" respectively, an optical signal is switched from the input 511 to the output 552. On the other hand, an optical signal is switched from the input 511 to the output 553 in a case where the 1×2 optical switch means 521, optical switch element 531B and 2×1 optical switch means 543 are controlled to be "CROSS state", "BAR state", and "BAR state" respectively, while an optical signal supplied to the input 511 is switched to the output 554 in a case where the 1×2 optical switch means 521, optical switch element 531B and optical switch means 544 are controlled to be "CROSS state", "CROSS state", and "BAR state" respectively.

As clearly understood from the illustration in FIG. 5, the longitudinal length of the 4×4 optical matrix switch is slightly larger than a dimension as small as three times a length of an optical switch element. As a result, that of the 4×4 optical matrix switch becomes less than the conventional 4×4 optical matrix switch as shown in FIG. 1.

Although the invention has been described with respect to specific embodiment for complete and clear disclosure, the appended claims are not to thus limited but are to be construed as embodying all modification and alternative constructions that may occur to one skilled in the art which fairly fall within the basic teaching herein set forth.

What is claimed is:

1. An optical matrix switch comprising,
  inputs of N in number where N is an integer,
  outputs of M in number where M is an integer,
  1×M/2 optical switch means of N in number each including a predetermined number of optical switch elements and having a single input connected to a corresponding one of said inputs of N, and having output of M/2 in number,
  optical switch groups of N/2 in number, each of said optical switch groups including optical switch elements of M/2 in number, each of said optical switch elements being of a 2×2 optical switch element having two inputs and two outputs, wherein each of said 2×2 optical switch elements is operable to have a "BAR" state, in which a first of said two inputs is connectable to a first of said two outputs and a second of said inputs is connectable to a second of said two outputs and a "CROSS" state, in which said first of said two inputs is connectable to said second of said two outputs and said second of said two inputs is connectable to said first of said two outputs, and
  N/2×1 optical switch means of M in number each including a predetermined number of optical switch elements and having a single output connected to a corresponding one of said outputs of M, and having inputs of N/2 in number, and
  wherein said outputs of M/2 in each of said 1×M/2 optical switch means of N are respectively connected to said optical switch elements of M/2 of a corresponding group among said optical switch groups of N/2, and said inputs of N/2 in each of said N/2×1 optical switch means of M are respectively connected to optical switch elements each selected from each of said optical switch groups of N/2 whereby an optical signal supplied to any one of said inputs of N is switched to be appeared at a predetermined one of said output of M by selecting a predetermined one of optical signal transmitting paths formed through said optical switch groups of N/2 between said 1×M/2 optical switch means of N and said N/2×1 optical switch means of M in accordance with "BAR" and/or "CROSS" states of corresponding optical switch elements therein.

2. An optical matrix switch according to claim 1, wherein said predetermined number of optical switch elements in each of said 1×M/2 optical switch means of N is decided dependent upon a number of optical switch elements arranged in the longitudinal direction which is defined by an equation of $\log_2 M/2$, and said predetermined number of optical switch elements in each of said N/2×1 optical switch means of M is decided dependent upon a number of optical switch elements which is defined by an equation of $\log_2 N/2$.

3. An optical matrix switch comprising,
  four inputs and four outputs respectively provided on both end planes of a substrate,
  four 1×2 optical switch elements provided on said substrate each having one input connected to a corresponding one of said four inputs, and each having two outputs,
  two optical switch groups provided on said substrate each including two 2×2 optical switch elements each having two input and two output, and
  four 2×1 optical switch elements provided on said substrate each having two inputs, and having one output connected to a corresponding one of said four outputs,
  wherein four outputs of a first and third optical switch elements of said four 1×2 optical switch elements are connected to respective first inputs of said two 2×2 optical switch elements in each of said two optical switch groups, and four outputs of a second and fourth optical switch elements of said four 1×2 optical switch elements are connected to respective second inputs of said two 2×2 optical switch elements in each of said two optical switch groups, and four first inputs of said four 2×1 optical switch elements are connected to respective outputs of said two 2×2 optical switch elements in a first group of said two optical switch groups, and four second inputs of said 2×1 optical switch elements are connected to respective outputs of said two 2×2 optical switch elements in a second group of said two optical switch groups.

4. An optical matrix switch according to claim 3, wherein each of said four 1×2 optical switch elements, and of said four 2×1 optical switch elements is of a 2×2 optical switch element having two input and two outputs, and one of said two inputs being idle for each of said four 1×2 optical switch elements, and one of said two outputs being idle for each of said four 2×1 optical switch elements.

* * * * *